US012640799B2

(12) United States Patent 
Iwakuni et al.

(10) Patent No.: US 12,640,799 B2 
(45) Date of Patent: May 26, 2026

(54) COMMUNICATION SYSTEM, CONTROL METHOD, AND COMMUNICATION CONTROL DEVICE

(71) Applicant: NTT, Inc., Tokyo (JP)

(72) Inventors: Tatsuhiko Iwakuni, Musashino (JP); Daisei Uchida, Musashino (JP); Shuki Wai, Musashino (JP); Naoki Kita, Musashino (JP)

(73) Assignee: NTT, Inc., Tokyo (JP)

( * ) Notice: Subject to any disclaimer, the term of this patent is extended or adjusted under 35 U.S.C. 154(b) by 313 days.

(21) Appl. No.: 18/271,015

(22) PCT Filed: Jan. 12, 2021

(86) PCT No.: PCT/JP2021/000650 
§ 371 (c)(1), 
(2) Date: Jul. 5, 2023

(87) PCT Pub. No.: WO2022/153355 
PCT Pub. Date: Jul. 21, 2022

(65) Prior Publication Data 
US 2024/0072872 A1 Feb. 29, 2024

(51) Int. Cl. 
H04B 7/06 (2006.01) 
H04B 7/022 (2017.01) 
(52) U.S. Cl. 
CPC ......... H04B 7/06952 (2023.05); H04B 7/022 (2013.01); H04B 7/0617 (2013.01); H04B 7/0695 (2013.01) 
(58) Field of Classification Search 
CPC .. H04B 7/06952; H04B 7/022; H04B 7/0617; H04B 7/0695; H04B 7/06; H04B 7/0608; H04B 7/0693; H04B 7/06956 
See application file for complete search history.

(56) References Cited 
U.S. PATENT DOCUMENTS 9,906,351 B2 * 2/2018 Ma .......................... H04B 7/022 
2004/0235527 A1 * 11/2004 Reudink .............. H04B 7/0491 
455/560 
(Continued)

FOREIGN PATENT DOCUMENTS

JP 2017143320 A 8/2017

OTHER PUBLICATIONS

Takinami et al., "Standardization trend and elemental technology of millimeter wave band wireless LAN system", The Institute of Electronics, Information and Communication Engineers, Communication Society Magazine, autumn 2016, No. 38, p. 100-106. 
(Continued)

*Primary Examiner* — Redentor Pasia 
(74) *Attorney, Agent, or Firm* — Harness, Dickey & Pierce, P.L.C.

(57) ABSTRACT

A wireless communication system includes: a communication control device; and a plurality of wireless base station devices capable of forming a plurality of beams and transmitting signals, the communication control device including: an estimation unit configured to estimate whether or not a range of a first beam emitted by a first wireless base station device among the plurality of wireless base station devices is correlated with a range of a second beam emitted by a second wireless base station device different from the first wireless base station device; and a use prohibition unit configured to prohibit the first wireless base station device from using the first beam or prohibit the second wireless base station device from using the second beam in a case where the estimation unit estimates that the range of the first beam is correlated with the range of the second beam.

9 Claims, 7 Drawing Sheets

(56) References Cited

U.S. PATENT DOCUMENTS

| | | | |
|---|---|---|---|
| 2017/0230910 A1 | 8/2017 | Kimura | |
| 2019/0222299 A1* | 7/2019 | Treesh | H04B 7/18508 |
| 2019/0223058 A1* | 7/2019 | Fukui | H04W 36/0016 |
| 2019/0238282 A1* | 8/2019 | Cao | H04J 11/00 |
| 2020/0077411 A1* | 3/2020 | Raghavan | H04B 7/0617 |
| 2020/0396706 A1* | 12/2020 | Sandgren | H04L 27/2607 |
| 2021/0036759 A1* | 2/2021 | Kim | H04B 7/0695 |
| 2021/0058140 A1* | 2/2021 | Schwab | H04W 16/28 |
| 2021/0203395 A1* | 7/2021 | Gao | H04B 7/0693 |
| 2022/0116791 A1* | 4/2022 | Lin | H04W 16/28 |
| 2022/0255611 A1* | 8/2022 | Chavva | H04B 7/088 |

OTHER PUBLICATIONS

IEEE, "Part 11: Wireless LAN Medium Access Control (MAC) and Physical Layer (PHY) Specifications Amendment 3: Enhancements for Very High Throughput in the 60 GHz Band" (IEEE Std 802. 11ad-2012), Dec. 28, 2012.
Uchida et al., "Study on High-Frequency Band Distributed Antenna System in Terminal High-Density/Shielding Environment". The Institute of Electronics, Information and Communication Engineers (IEICE) General Conference, 2020 B-5-87.

* cited by examiner

COMMUNICATION SYSTEM, CONTROL METHOD, AND COMMUNICATION CONTROL DEVICE

CROSS-REFERENCE TO RELATED APPLICATIONS

This application is a 371 National Stage of International Application No. PCT/JP2021/000650, filed on Jan. 12, 2021. The entire disclosure of the above application is incorporated herein by reference.

TECHNICAL FIELD

The present invention relates to a technology of a communication system, a control method, and a communication control device.

BACKGROUND ART

Wireless communication using millimeter waves and quasi-millimeter waves classified into a high frequency band as compared with the related art includes 3rd generation partnership project (3GPP) 5G (5th generation) new radio (NR), IEEE 802.11 ad, and the like. These kinds of wireless communication have advantages such as being able to secure a wide band as compared with a microwave band in the related art and having large rectilinearity and less interference with other communication. Thus, practical use has been promoted as means for achieving large-capacity wireless communication (for example, Non Patent Literature 1).

A distance attenuation amount of a wireless propagation path increases in accordance with a frequency. Thus, in communication in a millimeter wave band, in particular, in a wireless base station device installed on the ground, a directional beam is generally formed (beamforming) toward a wireless terminal station device that is a communication partner to transmit a signal. In addition, in a wireless base station device, it is also common to form a directional beam to receive a signal.

FIG. 9 is a conceptual diagram of a communication system using beamforming in a typical millimeter wave band. The wireless base station device selects a beam having maximum reception power on the wireless terminal station device side from directional beams that can be formed by the wireless base station device and are each indicated by a broken line. For example, in IEEE 802.11ad, beam selection is performed by procedure called a sector level sweep (SLS) (see Non Patent Literature 2).

First, a communication device (initiator: here, the wireless base station device) on a side that starts communication sequentially transmits signals using possible beams in a time division manner. In this event, a communication device (responder: here, the wireless terminal station device) on the opposite side receives a signal transmitted from the initiator with a beam having a maximum beam width and measures reception power thereof. The responder may also sequentially transmit signals using the beam. For beam selection on the wireless base station device side, beam selection is completed by sharing an ID of the beam for which the maximum reception power is obtained in the wireless terminal station device with the wireless base station device.

Similarly, in the 5G NR, a plurality of signal blocks called synchronization signal/physical broadcast channel (SS/PBCH) are sequentially transmitted in a time division manner for each beam of the wireless base station device. The wireless terminal station device reads this, measures which beam has the maximum reception power and feeds back the reception power to the wireless base station device, whereby the initial beam selection is completed.

In order to compensate for distance attenuation of a wireless propagation path in a high frequency band, the number of antenna elements included in the wireless communication device increases as a frequency becomes higher, and a width of a directional beam becomes narrower. In this event, in beam selection represented by the SLS and the SS/PBCH, the beam selection is performed by time division and brute force, which increases a processing period.

On the other hand, in the high frequency band, a Fresnel zone is minimized, and thus, a rapid decrease in reception power due to shielding also becomes a major problem. Thus, a high-frequency band wireless system has a distributed antenna configuration in which a large number of base stations are arranged, and their cover ranges overlap (see Non Patent Literature 3). Beam selection algorithm in the distributed antenna configuration requires to be performed separately for each distributed antenna, which further increases a processing period.

CITATION LIST

Non Patent Literature

Non Patent Literature 1: Takinami et al., "Standardization trend and elemental technology of millimeter wave band wireless LAN system", The Institute of Electronics, Information and Communication Engineers, Communication Society Magazine, autumn 2016, No. 38, p. 100-106

Non Patent Literature 2: IEEE, "Part 11: Wireless LAN Medium Access Control (MAC) and Physical Layer (PHY) Specifications Amendment 3: Enhancements for Very High Throughput in the 60 GHz Band" (IEEE Std 802.11ad-2012), 2012 Dec. 28

Non Patent Literature 3: Uchida et al., "Study on High-Frequency Band Distributed Antenna System in Terminal High-Density/Shielding Environment", The Institute of Electronics, Information and Communication Engineers (IEICE) General Conference, 2020 B-5-87

SUMMARY OF INVENTION

Technical Problem

In a distributed antenna environment in which a plurality of wireless base station devices that perform beamforming are arranged, service areas covered by the respective base station devices may overlap. In this case, beams are sequentially transmitted from the respective distributed antennas of the base station devices that cover overlapping service areas. As a result, a period required for beam search increases, which leads to a problem that beam selection cannot be efficiently performed.

In view of the above circumstances, an object of the present invention is to provide a technique capable of selecting a beam more efficiently.

Solution to Problem

One aspect of the present invention is a wireless communication system including: a communication control device; and a plurality of wireless base station devices capable of forming a plurality of beams and transmitting signals, the communication control device including: an estimation unit (hereinafter also referred to as "estimator") configured to estimate whether or not a range of a first beam emitted by a first wireless base station device among the plurality of wireless base station devices is correlated with a range of a second beam emitted by a second wireless base station device different from the first wireless base station device; and a use prohibition unit (hereinafter also referred to as "prohibitor") configured to prohibit the first wireless base station device from using the first beam or prohibit the second wireless base station device from using the second beam in a case where the estimation unit estimates that the range of the first beam is correlated with the range of the second beam.

One aspect of the present invention is a method for controlling a communication control device in a wireless communication system including the communication control device and a plurality of wireless base station devices capable of forming a plurality of beams and transmitting a signal, the method including: an estimation step of estimating whether or not a range of a first beam emitted by a first wireless base station device among the plurality of wireless base station devices is correlated with a range of a second beam emitted by a second wireless base station device different from the first wireless base station device; and a use prohibition step of prohibiting the first wireless base station device from using the first beam or prohibiting the second wireless base station device from using the second beam in a case where it is estimated in the estimation step that the range of the first beam is correlated with the range of the second beam.

One aspect of the present invention is a communication control device in a wireless communication system including the communication control device and a plurality of wireless base station devices capable of forming a plurality of beams and transmitting signals, the communication control device including: an estimation unit configured to estimate whether or not a range of a first beam emitted by a first wireless base station device among the plurality of wireless base station devices is correlated with a range of a second beam emitted by a second wireless base station device different from the first wireless base station device; and a use prohibition unit configured to prohibit the first wireless base station device from using the first beam or prohibit the second wireless base station device from using the second beam in a case where the estimation unit estimates that the range of the first beam is correlated with the range of the second beam.

Advantageous Effects of Invention

According to the present invention, a beam can be selected more efficiently.

DESCRIPTION OF EMBODIMENTS

Figure 1:
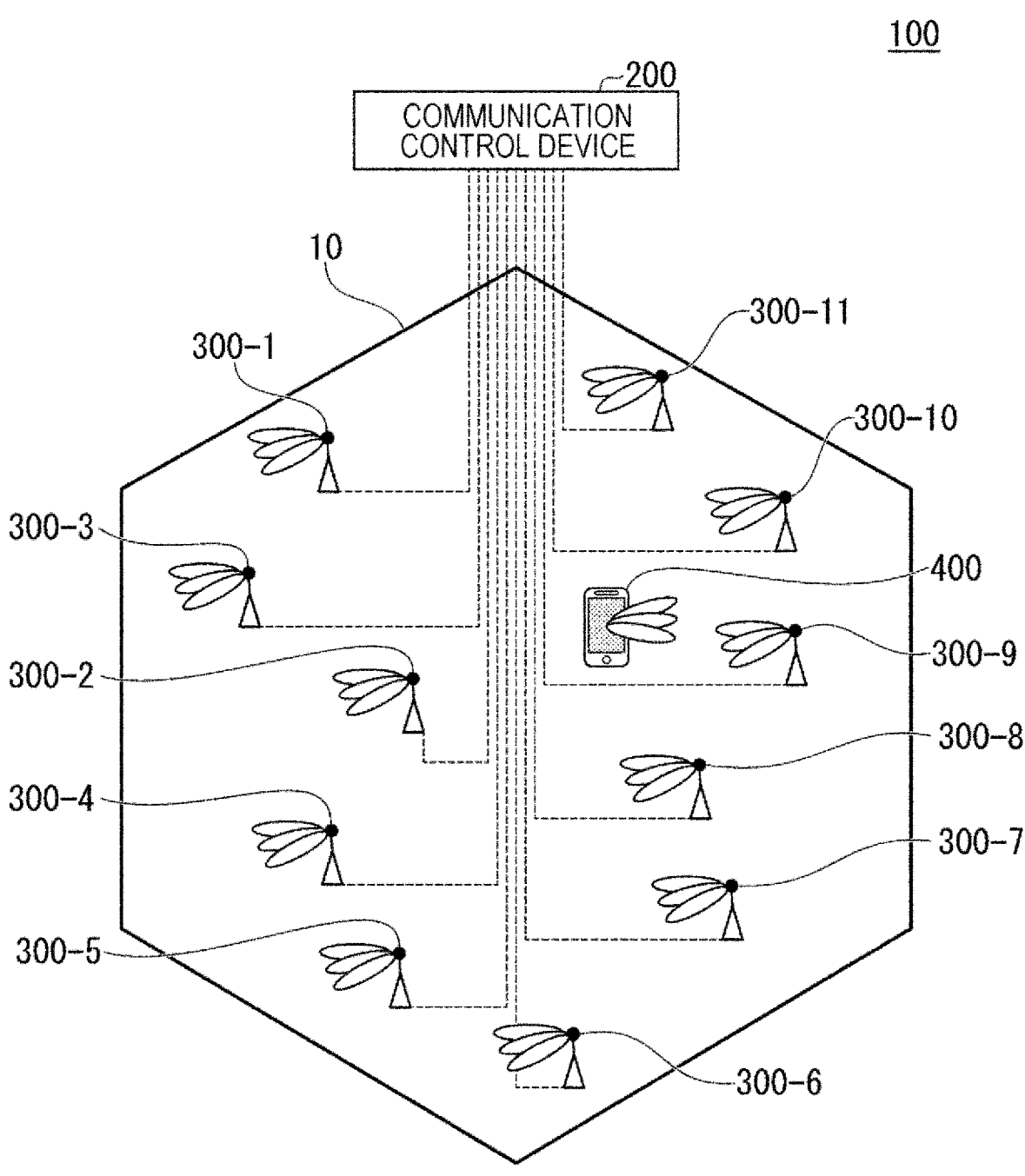
FIG. 1 is an overall configuration diagram of a wireless communication system.

An embodiment of the present invention will be described in detail with reference to the drawings. FIG. 1 is an overall configuration diagram of a wireless communication system 100 according to an embodiment. The wireless communication system 100 includes one communication control device 200 in one cell 10. In addition, the wireless communication system 100 includes a plurality of wireless base station devices (hereinafter, referred to as "base stations") 300-1, 300-2, 300-3, 300-4, 300-5, 300-6, 300-7, 300-8, 300-9, 300-10, and 300-11 in the cell 10. In FIG. 1, 11 base stations are illustrated as an example, but the number of base stations is not limited to 11 as long as a plurality of base stations are provided.

Hereinafter, any one of the base stations 300-1, 300-2, 300-3, 300-4, 300-5, 300-6, 300-7, 300-8, 300-9, 300-10, and 300-11 will be referred to as a base station 300 unless otherwise distinguished. In the wireless communication system 100, each base station 300 is connected to the communication control device 200. Furthermore, the base station 300 performs various kinds of communication with a wireless terminal station (hereinafter, referred to as a "terminal station") 400.

Hereinafter, an embodiment in which each base station 300 transmits a beam at an arbitrary timing that does not temporally overlap with timings of other base stations 300 will be described as an example.

Figure 2:
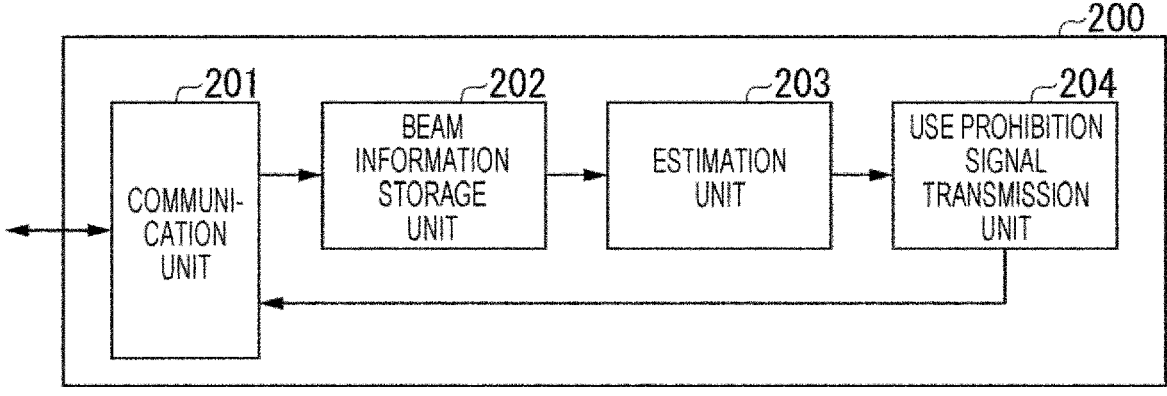
FIG. 2 is a block diagram illustrating a configuration of a communication control device.

FIG. 2 is a block diagram illustrating a configuration of the communication control device 200. The communication control device 200 includes a communication unit 201, a beam information storage unit 202, an estimation unit 203, and a use prohibition signal transmission unit 204.

The communication unit 201 is an interface for communicating with the base station 300. The beam information storage unit 202 stores beam information transmitted from the base station 300 received by the communication unit 201 in a storage device (not illustrated). The beam information includes a base station identifier, a terminal identifier, a beam ID, and reception power. The base station identifier is an identifier uniquely indicating the base station 300. The terminal identifier is an identifier uniquely indicating the terminal station 400. The beam ID is information uniquely indicating a beam transmitted from the base station 300 indicated by the base station identifier to the terminal station 400 indicated by the terminal identifier. The reception power is information indicating reception power when the base station 300 indicated by the base station identifier transmits a beam corresponding to the beam ID and the terminal station 400 indicated by the terminal identifier receives the beam.

The estimation unit 203 estimates whether or not a range of a first beam emitted by a first base station is correlated with a range of a second beam emitted by a second base station different from the first base station among the base stations 300. An estimation method will be described later. Note that the first base station and the second base station are any of the base stations 400.

In a case where the estimation unit 203 estimates that the range of the first beam is correlated with the range of the second beam, the use prohibition signal transmission unit 204 transmits a use prohibition signal via the communication unit 201. The use prohibition signal is a signal that designates a beam ID of a beam for which use is prohibited. The use prohibition signal is transmitted to one of the first base station and the second base station. In this way, the use prohibition signal transmission unit 204 prohibits the first base station from using the first beam or prohibits the second base station from using the second beam.

Figure 3:
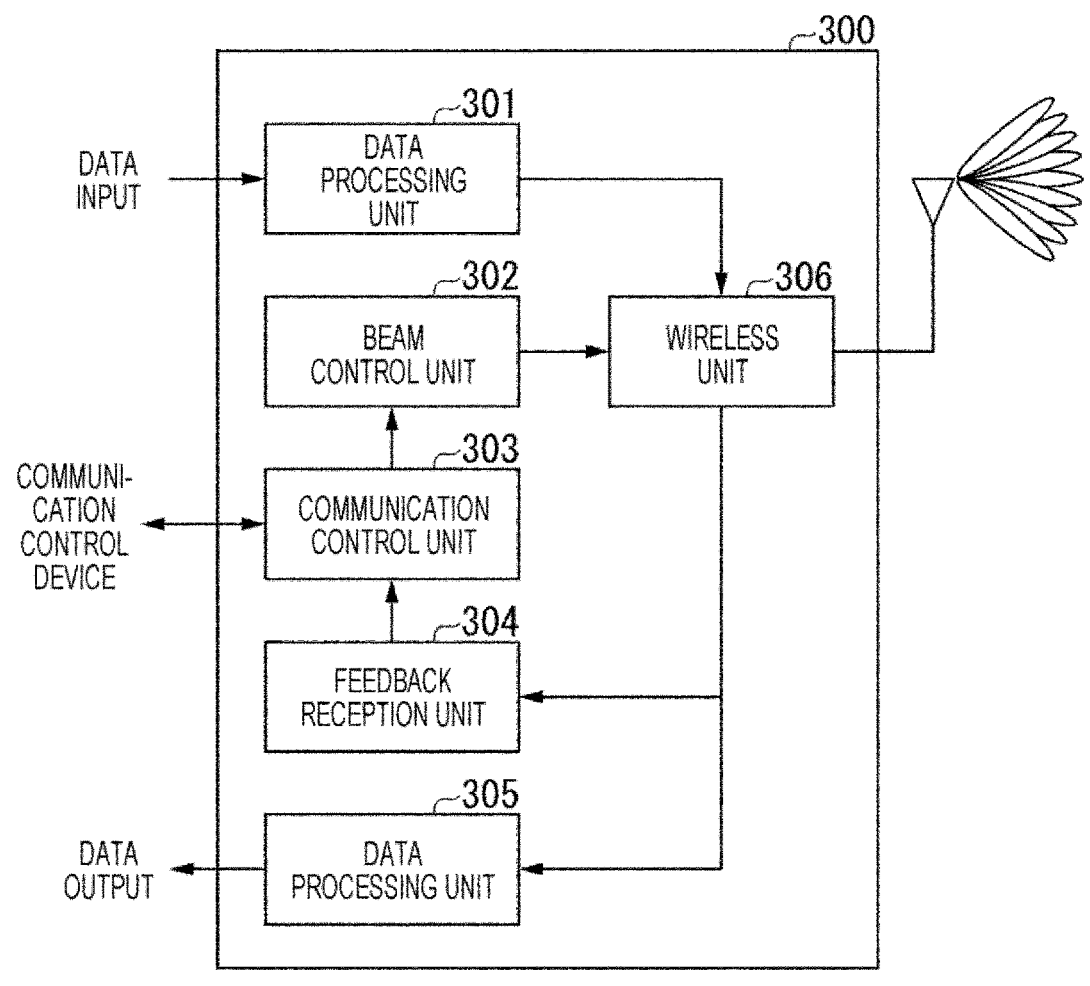
FIG. 3 is a block diagram illustrating a configuration of a base station.

FIG. 3 is a block diagram illustrating a configuration of the base station 300. The base station 300 includes data processing units 301 and 305, a beam control unit 302, a communication control unit 303, a feedback reception unit 304, and a wireless unit 306.

The data processing unit 301 outputs input data to the wireless unit 306. The wireless unit 306 wirelessly transmits the data output from the data processing unit 301 and outputs the wirelessly received data to the feedback reception unit 304 or the data processing unit 305. The feedback reception unit 304 receives feedback information to be described later transmitted from the terminal station 400 and transfers the received feedback information to the communication control unit 303. The communication control unit 303 is connected to the communication control device 200 in a wired or wireless manner. The communication control unit 303 transfers reception content output by the feedback reception unit 304 to the communication control device 200. The communication control unit 303 outputs the use prohibition signal received from the communication control device 200 to the beam control unit 302. The beam control unit 302 controls the wireless unit 306 so as not to transmit the beam corresponding to the beam ID designated by the use prohibition signal.

Figure 4:
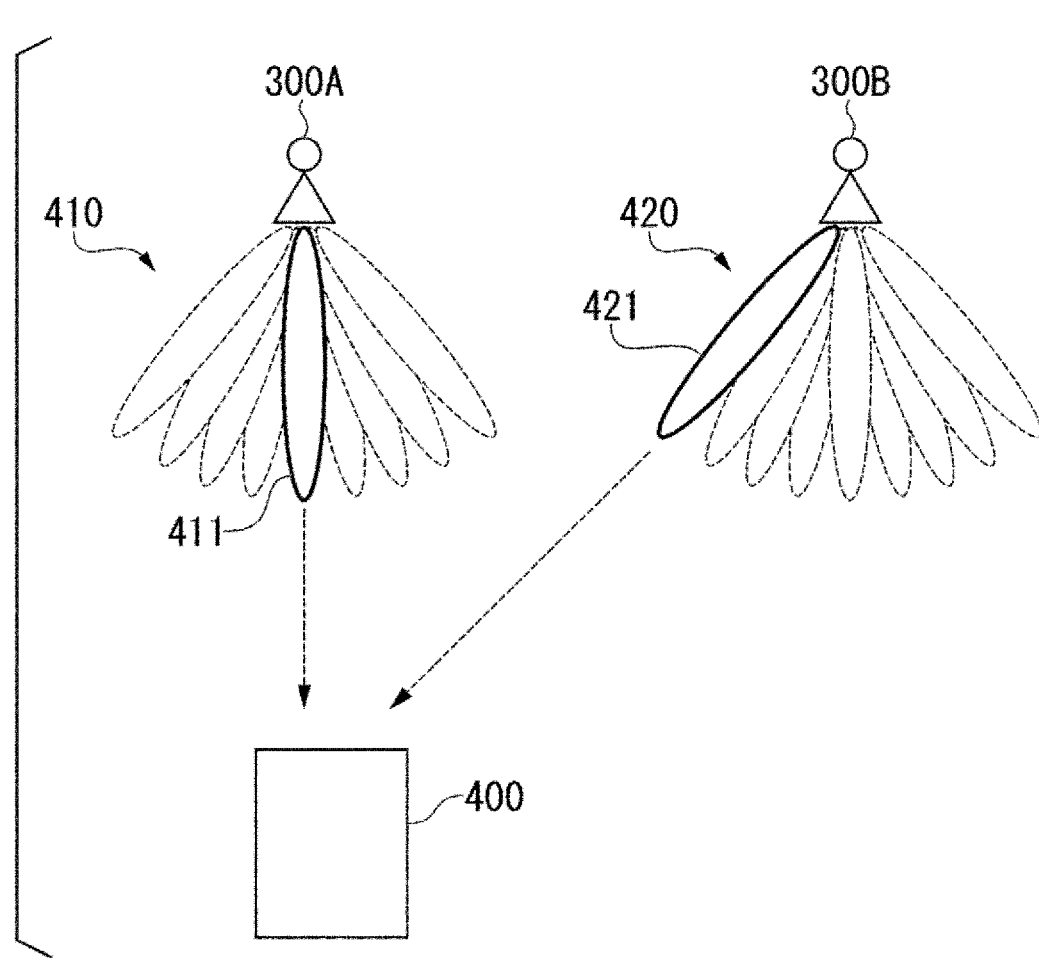
FIG. 4 is a view for explaining beam transmission.

FIG. 4 is a view for explaining beam transmission. FIG. 4 illustrates two base stations 300A and 300B and the terminal station 400 as an example. The base station 300A can transmit a beam group 410 including 9 beams as an example. Similarly, the base station 300B can transmit a beam group 420 including 9 beams as an example.

As illustrated in FIG. 4, the beams are transmitted in different directions when viewed from the base station 300 and are transmitted in a state where beam IDs indicating respective beams are superimposed. When the terminal station 400 receives the beam, the terminal station 400 measures reception power and stores the reception power together with the beam ID.

When the terminal station 400 receives all the beams belonging to the beam group 410 from the base station 300A, the terminal station 400 transmits to the base station 300A, the beam ID with maximum reception power, the reception power, and the terminal identifier indicating the terminal station 400 as feedback information.

Similarly, when the terminal station 400 receives all the beams belonging to the beam group 420 from the base station 300B, the terminal station 400 transmits the beam ID with maximum reception power, the reception power, and the terminal identifier indicating the terminal station 400 to the base station 300B as feedback information. The base stations 300A and 300B communicate with the terminal station 400 using the beam with the beam ID indicated by the feedback information.

For example, in FIG. 4, it is assumed that reception power of a beam 411 is the largest among reception power of the beams transmitted from the base station 300A. It is assumed that reception power of a beam 421 is the largest among reception power of the beams transmitted from the base station 300B. In this case, the base station 300A communicates with the terminal station 400 using the beam 411. The base station 300B communicates with the terminal station 400 using the beam 421.

Next, an estimation method of the estimation unit 203 will be described. In the following description, it is assumed that a first base station transmits a first beam, and a second base station transmits a second beam. The estimation unit 203 derives a correlation coefficient using the reception power when the terminal station 400 receives the first beam and the reception power when the terminal station 400 receives the second beam. In a case where the derived correlation coefficient is equal to or greater than a predetermined value, the estimation unit 203 estimates that a range of the first beam is correlated with a range of the second beam.

Specific description will be given using a mathematical expression. In the following description, $\bar{P}$ indicates a bar of P. Then, $P_{ai}$ is reception power when the first beam is received for the i-th time ($1 \leq i \leq n$). $\bar{P}_a$ is an average value of $P_{ai}$. Similarly, $P_{bi}$ is reception power when the second beam is received for the i-th time. $\bar{P}_b$ is an average value of $P_{bi}$. Note that the first base station and the second base station transmit beams at substantially the same time and at the same cycle. In this event, the estimation unit 203 derives a correlation coefficient $\gamma_{ab}$ using the following (1).

[Math. 1]

$$r_{ab} = \frac{\sum_{i=1}^{n}\left(P_{ai} - \bar{P}_a\right)\left(P_{bi} - \bar{P}_b\right)}{\sqrt{\sum_{i=1}^{n}\left(P_{ai} - \bar{P}_a\right)^2}\sqrt{\sum_{i=1}^{n}\left(P_{bi} - \bar{P}_b\right)^2}} \tag{1}$$

In a case where the correlation coefficient $\gamma_{ab}$ is equal to or greater than a predetermined value, the estimation unit 203 estimates that the range of the first beam is correlated with the range of the second beam. The predetermined value may be determined by an experiment, or the like. In addition, the predetermined value may be dynamically changed according to change in a surrounding propagation environment.

Note that only a beam for which transmission is prohibited may be a favorable beam due to change in the surrounding propagation environment. For this reason, a beam transmission prohibition period may be set, and beam transmission may be prohibited only within a certain period of time.

In general, in a case where n is small (in a case where the number of samples of the reception power is small), there is a high possibility that the correlation coefficient of (1) will not be a significant value. Thus, the correlation coefficient does not have to be derived until a predetermined number of samples with which reliability of the correlation coefficient is secured to some extent or more is obtained. In this case, the correlation is unknown while the correlation coefficient is not derived, and thus, the beam transmission does not have to be prohibited.

In addition, the reliability of the correlation coefficient obtained in the above (1) may decrease as the propagation environment changes. Thus, past reception power used in the above (1) may be only reception power obtained for a certain period dating back from a current time point or the latest N pieces of reception power (N is a value at which reliability of the correlation coefficient is secured to some extent or more).

The estimation unit 203 may derive a forgetting coefficient type correlation coefficient $\gamma'_{ab}$ ab by the following (2) instead of the above (1). As a result, a correlation coefficient in which the latest reception power is most taken into account is derived.

[Math. 2]

$$r'_{ab} = \frac{K\left((P_{ai} - \overline{P}_a[i])(P_{bi} - \overline{P_b}[i])\right)[n]}{\sqrt{K\left((P_{ai} - \overline{P}_a[i])^2\right)[n]}\sqrt{K\left((P_{bi} - \overline{P_b}[i])^2\right)[n]}} \quad (2)$$

Here, $\overline{P}_a[*]$, $\overline{P}_b[*]$, $K(*)[*]$, and $\alpha$ are as described in the following (3).

[Math. 3]

$$\overline{P}_a[i]=(1-\alpha)\overline{P}_a[i-1]+\alpha P_{ai}\overline{P_b}[i]=(1-\alpha)$$
$$\overline{P_b}[i-1]+\alpha P_{bi}K(X)[i]=(1-\alpha)K(X)[i-1]+\alpha X 0<\alpha<1 \quad (3)$$

In a case where the correlation coefficient $\gamma_{ab}$ is equal to or greater than a predetermined value, the estimation unit 203 estimates that the range of the first beam is correlated with the range of the second beam. The predetermined value may be determined by an experiment, or the like. In addition, the predetermined value may be dynamically changed according to change in a surrounding propagation environment.

When the estimation unit 203 estimates that the range of the first beam is correlated with the range of the second beam, there is a high possibility that the range of the first beam and the range of the second beam partially or entirely overlap. In this case, beam search may be performed with either the first beam or the second beam. Thus, use of the first beam is prohibited or use of the second beam is prohibited, so that a period required for beam search is reduced, and the beam can be selected more efficiently.

Figure 5:
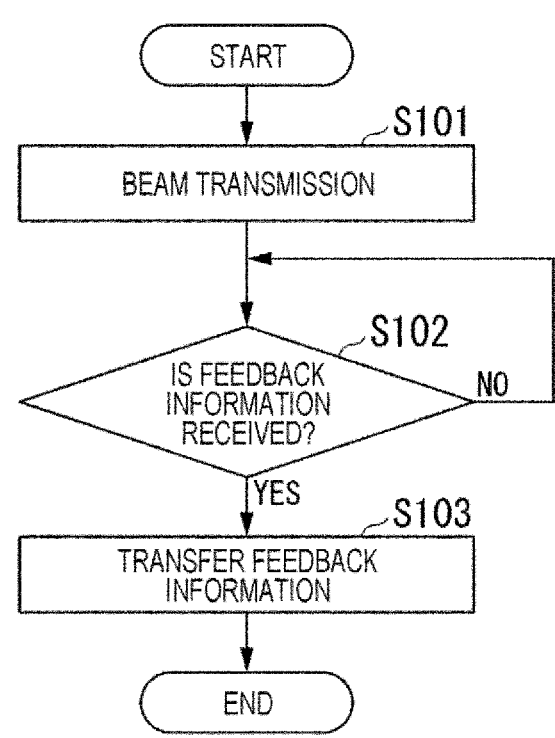
FIG. 5 is a flowchart illustrating flow of processing upon beam transmission by the base station.

The flow of the processing described above will be described with reference to a flowchart. FIG. 5 is a flowchart illustrating flow of processing upon beam transmission by the base station 300. The base station 300 transmits a beam (step S101). Here, all beams that can be transmitted are sequentially transmitted in a time division manner. Thereafter, the base station 300 waits for feedback information from the terminal station 400. The feedback information includes a terminal identifier of a terminal that has transmitted the feedback information, a beam ID with maximum reception power, and the reception power.

When the base station 300 receives the feedback information (step S102: YES), the base station 300 transfers the received feedback information to the communication control device 200 together with the base station identifier of the base station 300 (step S103) and ends the processing. The feedback information and the base station identifier constitute the beam information described above. Thus, in step S103, the beam information is transmitted from the base station 300 to the communication control device 200.

Figure 6:
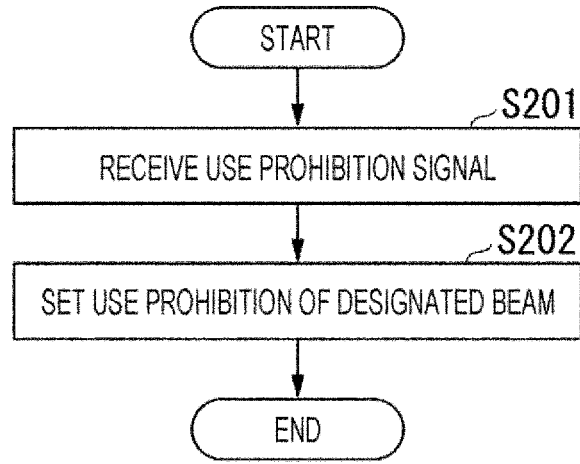
FIG. 6 is a flowchart illustrating flow of processing upon reception of a use prohibition signal by the base station.

FIG. 6 is a flowchart illustrating flow of processing upon reception of the use prohibition signal by the base station 300. When the base station 300 receives the use prohibition signal (step S201), the base station 300 sets use prohibition of the beam designated by the use prohibition signal (step S202) and ends the processing. As described above, the beam control unit 302 controls the wireless unit 306 so as not to transmit the beam corresponding to the beam ID designated in the use prohibition signal. As a result, the beam for which use is prohibited is not transmitted, so that a period required for beam search is reduced, and a beam can be selected more efficiently.

Figure 7:
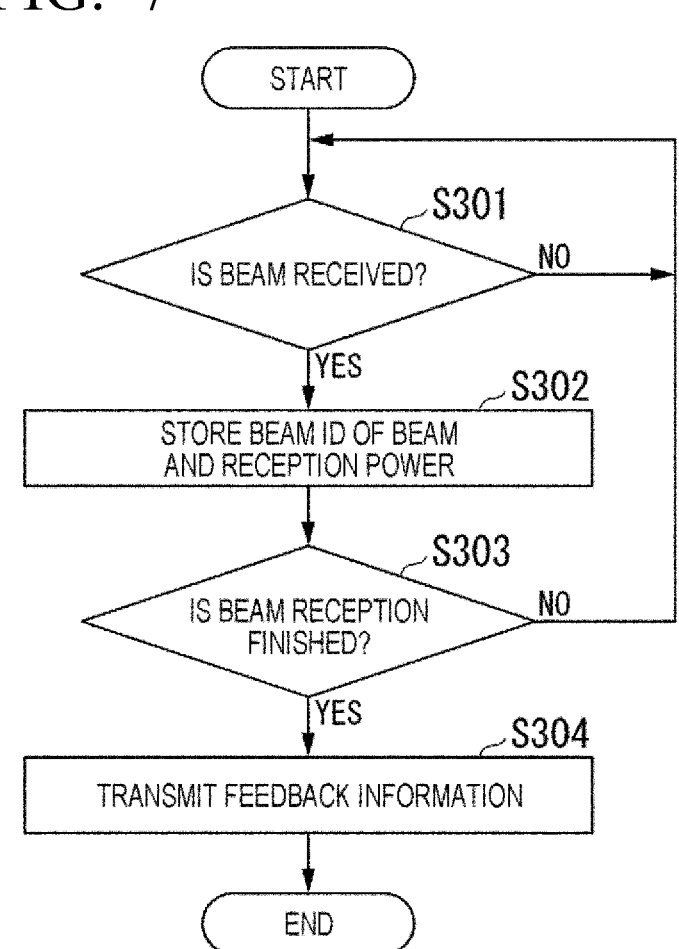
FIG. 7 is a flowchart illustrating flow of processing upon beam reception by a terminal station.

FIG. 7 is a flowchart illustrating flow of processing upon beam reception by the terminal station 400. When the terminal station 400 receives the beam (step S301: YES), the terminal station 400 stores a beam ID of the beam and reception power of the beam in a storage device (not illustrated) (step S302).

The terminal station 400 determines whether or not reception of all beams has been completed (step S303). Note that the terminal station 400 determines whether or not reception of the beams has been completed on the basis of information such as the number of remaining beams embedded in the beams. If reception of all the beams has not been completed (step S303: NO), reception of beams is waited in step S301.

In a case where reception of all the beams has been completed (step S303: YES), the terminal station 400 searches for maximum reception power among the stored reception power, transmits the feedback information to the base station 300 (step S304) and ends the processing.

Figure 8:
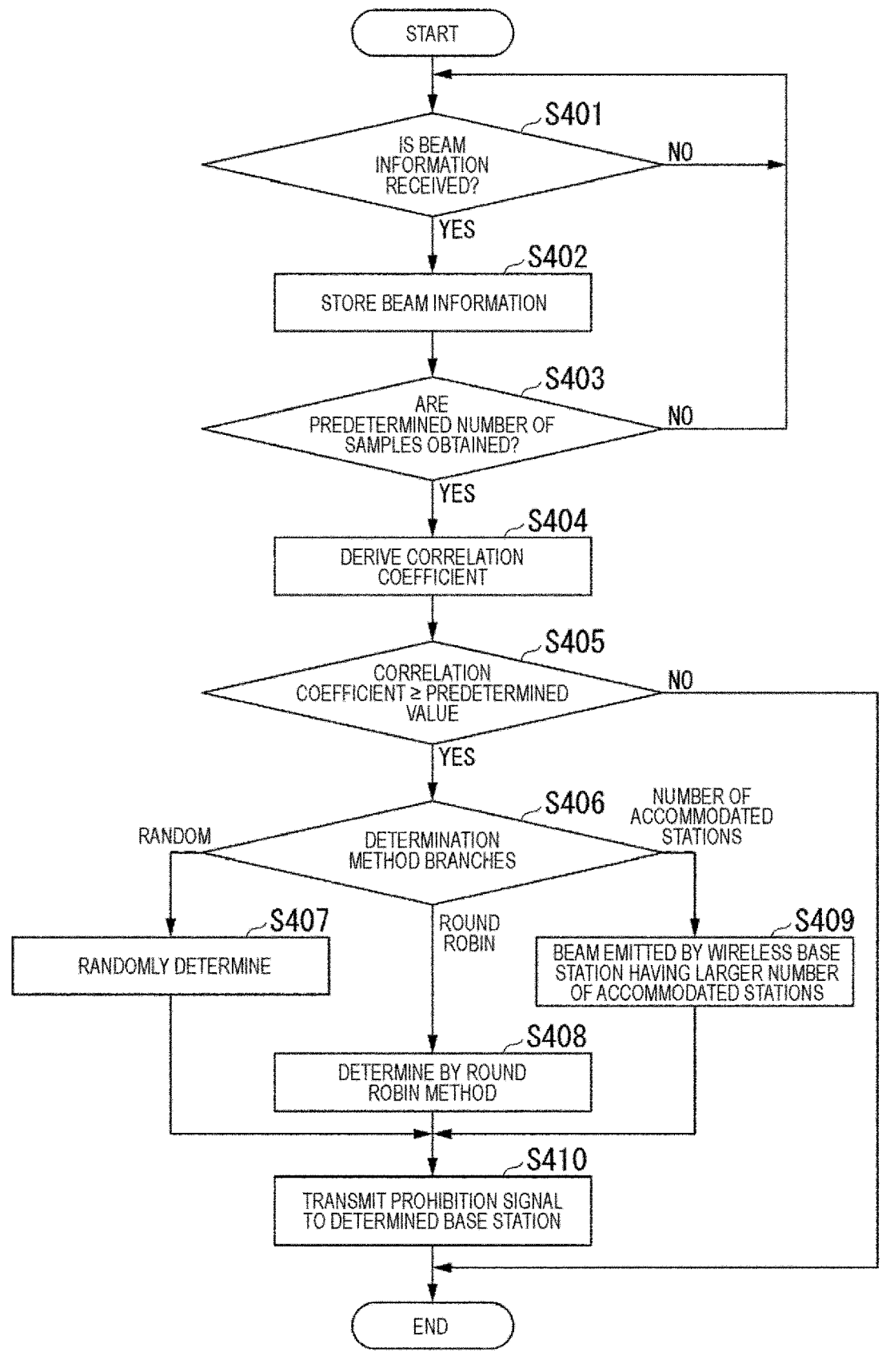
FIG. 8 is a flowchart illustrating flow of processing upon beam information reception by the communication control device.
Figure 9:
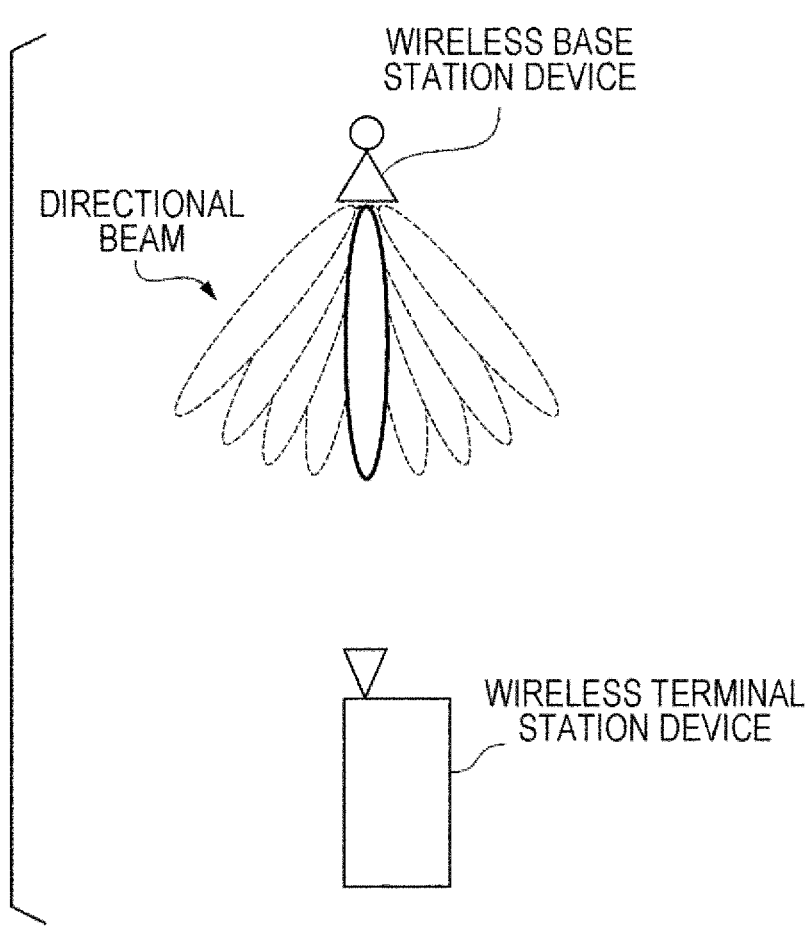
FIG. 9 is a conceptual diagram of a communication system using beamforming in a general millimeter wave band.

FIG. 8 is a flowchart illustrating flow of processing upon beam information reception by the communication control device 200. When the communication control device 200 receives the beam information (step S401: YES), the communication control device 200 stores the beam information in a storage device (not illustrated) (step S402). The communication control device 200 determines whether or not beam information corresponding to a predetermined number of samples has been obtained (step S403). As described above, the predetermined number of samples is the number of samples in which reliability of the correlation coefficient is secured to some extent or more.

In a case where the beam information corresponding to the predetermined number of samples has not been obtained (step S403: NO), reception of the beam information is waited in step S401. In a case where beam information corresponding to the predetermined number of samples has been obtained (step S403: YES), the communication control device 200 derives a correlation coefficient by the above (1) or (2) (step S404). The communication control device 200 determines whether or not the correlation coefficient is equal to or greater than a predetermined value (step S405).

In a case where the correlation coefficient is not equal to or greater than the predetermined value described above (step S405: NO), the communication control device 200 ends the processing as it is. In a case where the correlation coefficient is equal to or greater than the predetermined value (step S405: YES), the communication control device 200 determines a beam for which use is to be prohibited. There are three determination methods. Which of the three methods is used is set in advance, and the setting content is stored in a storage device (not illustrated). The processing of the communication control device 200 branches in step S406 with reference to the setting content.

The first determination method is a method in which a beam for which use is to be prohibited is randomly determined. The second determination method is a method in which a beam for which use is to be prohibited is determined by a round robin method. Specifically describing this second method, for example, in a case where use of any one of the beam A and the beam B is prohibited, use is sequentially prohibited in order of the beam A, the beam B, and the beam A again. The third determination method is a method in which use of a beam emitted by the base station 300 having a larger number of accommodated terminal stations 400 is prohibited.

According to the first and second methods, it is possible to prevent load of the base station 300 from being biased by preventing the beam for which use is to be prohibited from being biased only to one of the beams. According to the third method, it is possible to distribute the load of the base station 300.

Returning to the description of the flowchart, in a case where the beam is determined by the first method in step S406, the communication control device 200 randomly determines the beam for which use is to be prohibited (step S407), and the processing proceeds to step S410. In a case where the beam is determined by the second method, the communication control device 200 determines the beam for which use is to be prohibited by the round robin method (step S408), and the processing proceeds to step S410. In a case where the beam is determined by the third method, the communication control device 200 sets the beam emitted by the base station 300 having the larger number of accommodated terminal stations 400 as the beam for which use is to be prohibited (step S409), and the processing proceeds to step S410.

The communication control device 200 transmits the use prohibition signal to the base station 300 that emits the beam determined in step S407, S408, or S409 (step S410) and ends the processing.

In the embodiment described above, the description has been provided on the assumption that the terminal station 400 transmits the feedback information for one beam of the base station 300, but the feedback information for the plurality of beams received from the plurality of terminal stations 400 around the base station 300 may be transferred to the communication control device 200 as in the measurement report in 5G NR. Also in this case, the present embodiment can be applied by deriving a correlation coefficient of reception power for each piece of beam information.

Furthermore, the correlation coefficient may be calculated using any machine learning method. As a result, the correlation coefficient may be derived using a calculation formula in consideration of a magnitude of arbitrary reception power and fluctuation of the reception power.

Furthermore, in the present embodiment, the embodiment has been described as an example in which each base station 300 transmits a beam at an arbitrary timing that does not temporally overlap with timings of other base stations 300. Not limited to an arbitrary timing that does not temporally overlap, in a centralized wireless communication system such as 5G NR, the communication control device may instruct each wireless base station device about a beam transmission timing.

The communication control device 200 may be constituted using a processor such as a central processing unit (CPU) and a memory. In this case, the communication control device 200 functions as the communication control device 200 by the processor executing the program. Note that all or some of the functions of the communication control device 200 may be implemented by using hardware such as an application specific integrated circuit (ASIC), a programmable logic device (PLD), or a field programmable gate array (FPGA). The program may be recorded in a computer-readable recording medium. Examples of the computer-readable recording medium include a portable medium such as a flexible disk, a magneto-optical disk, a ROM, a CD-ROM, and a semiconductor storage device (for example, a solid state drive (SSD)), and a storage device such as a hard disk and a semiconductor storage device incorporated in a computer system. The program may be transmitted via an electric communication line.

Although the embodiment of the present invention has been described in detail with reference to the drawings above, specific configurations are not limited to the embodiment and include designs, and the like, without departing from the gist of the present invention.

INDUSTRIAL APPLICABILITY

The present invention is applicable to wireless communication using millimeter waves and quasi-millimeter waves classified into a high frequency band.

REFERENCE SIGNS LIST

10 Cell
100 Wireless communication system
200 Communication control device
201 Communication unit
202 Beam information storage unit
203 Estimation unit
204 Use prohibition signal transmission unit
300, 300-1, 300-2, 300-3, 300-4, 300-5, 300-6, 300-7, 300-8, 300-9, 300-10, 300-11, 300A, 300B Base station
301 Data processing unit
302 Beam control unit
303 Communication control unit
304 Feedback reception unit
305 Data processing unit
306 Wireless unit
400 Terminal station
410, 420 Beam group
411, 421 Beam

The invention claimed is:

1. A wireless communication system comprising a communication control device and a plurality of wireless base station devices capable of forming a plurality of beams and transmitting signals, wherein the communication control device comprises:

an estimation circuitry configured to estimate whether or not a range of a first beam emitted by a first wireless base station device among the plurality of wireless base station devices is correlated with a range of a second beam emitted by a second wireless base station device different from the first wireless base station device; and a use prohibition circuitry configured to prohibit in performing a beam search, the first wireless base station device from transmitting the first beam of the plurality of beams of the first wireless base station device, or prohibit the second wireless base station device from transmitting the second beam of the plurality of beams of the second wireless base station device, in a case where the estimation circuitry estimates that the range of the first beam is correlated with the range of the second beam.

2. The wireless communication system according to claim 1, wherein the estimation circuitry derives a correlation coefficient using reception power when a wireless terminal station receives the first beam and the reception power when the wireless terminal station receives the second beam, the reception power being obtained for a certain period dating back from a current time point, or being a latest N pieces of reception power, and estimates that the range of the first beam is correlated with the range of the second beam in a case where the derived correlation coefficient is equal to or greater than a predetermined value.

3. The wireless communication system according to claim 1, wherein the estimation circuitry derives a forgetting coefficient type correlation coefficient using reception power when a wireless terminal station receives the first beam and the reception power when the wireless terminal station receives the second beam, the reception power being obtained for a certain period dating back from a current time point, or being a latest N pieces of reception power, and estimates that the range of the first beam is correlated with the range of the second beam in a case where the derived correlation coefficient is equal to or greater than a predetermined value.

4. The wireless communication system according to claim 1, wherein the use prohibition circuitry randomly determines a beam for which use is to be prohibited between the first beam and the second beam or determines the beam by a round robin method.

5. The wireless communication system according to claim 1, wherein the use prohibition circuitry prohibits use-transmission of a beam emitted by a wireless base station having a larger number of accommodated wireless terminal stations, among the first beam emitted by the first wireless base station device and the second beam emitted by the second wireless base station device.

6. The wireless communication system according to claim 1, wherein each of the plurality of wireless base station devices comprises:

a wireless circuitry configured to transmit the plurality of beams and receive, from a wireless terminal station, feedback information which includes an identifier of a beam whose reception power is a maximum and the reception power of the beam; and a communication control circuitry configured to transmit the received feedback information to the communication control device, wherein the estimation circuitry of the communication control device estimates whether or not the range of the first beam is correlated with the range of the second beam, based on the reception power of the beam whose reception power is the maximum included in each of the feedback information received from the plurality of wireless base station devices.

7. A method for controlling a communication control device in a wireless communication system comprising the communication control device and a plurality of wireless base station devices capable of forming a plurality of beams and transmitting signals, the method comprising:

estimating whether or not a range of a first beam emitted by a first wireless base station device among the plurality of wireless base station devices is correlated with a range of a second beam emitted by a second wireless base station device different from the first wireless base station device; and prohibiting in performing a beam search, the first wireless base station device from transmitting the first beam of the plurality of beams of the first wireless base station device, or prohibiting the second wireless base station device from transmitting the second beam of the plurality of beams of the second wireless base station device, in a case where it is estimated in the estimating that the range of the first beam is correlated with the range of the second beam.

8. A communication control device in a wireless communication system comprising the communication control device and a plurality of wireless base station devices capable of forming a plurality of beams and transmitting signals, the communication control device comprising:

an estimation circuitry configured to estimate whether or not a range of a first beam emitted by a first wireless base station device among the plurality of wireless base station devices is correlated with a range of a second beam emitted by a second wireless base station device different from the first wireless base station device; and a use prohibition circuitry configured to prohibit in performing a beam search, the first wireless base station device from transmitting the first beam of the plurality of beams of the first wireless base station device, or prohibit the second wireless base station device from transmitting the second beam of the plurality of beams of the second wireless base station device, in a case where the estimation circuitry estimates that the range of the first beam is correlated with the range of the second beam.

9. The communication control device according to claim 8, wherein the estimation circuitry derives a correlation coefficient using reception power when a wireless terminal station receives the first beam and the reception power when the wireless terminal station receives the second beam, the reception power being obtained for a certain period dating back from a current time point, or being a latest N pieces of reception power, and estimates that the range of the first beam is correlated with the range of the second beam in a case where the derived correlation coefficient is equal to or greater than a predetermined value.

* * * * *